United States Patent
Orsi et al.

(10) Patent No.: US 12,432,125 B2
(45) Date of Patent: Sep. 30, 2025

(54) DISTRIBUTED SERVICE ACTIVATION METHOD VIA BLOCKCHAIN

(71) Applicant: Telefonaktiebolaget LM Ericsson (publ), Stockholm (SE)

(72) Inventors: Stefano Orsi, Viareggio (IT); Riccardo Ceccatelli, San Miniato (IT); Paolo Debenedetti, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/559,478

(22) PCT Filed: Jul. 5, 2021

(86) PCT No.: PCT/EP2021/068459
§ 371 (c)(1),
(2) Date: Nov. 7, 2023

(87) PCT Pub. No.: WO2023/280372
PCT Pub. Date: Jan. 12, 2023

(65) Prior Publication Data
US 2024/0243977 A1   Jul. 18, 2024

(51) Int. Cl.
*H04L 41/28* (2022.01)
*H04L 9/00* (2022.01)
*H04L 41/5054* (2022.01)

(52) U.S. Cl.
CPC .............. *H04L 41/28* (2013.01); *H04L 9/50* (2022.05); *H04L 41/5054* (2013.01)

(58) Field of Classification Search
CPC ........ H04L 41/28; H04L 41/5054; H04L 9/50
See application file for complete search history.

(56) References Cited

U.S. PATENT DOCUMENTS

| | | | | |
|---|---|---|---|---|
| 7,855,949 B1* | 12/2010 | Cortez | ................ | H04L 12/462 370/242 |
| 2009/0257746 A1* | 10/2009 | Reina | ................ | H04J 14/0269 398/34 |

(Continued)

FOREIGN PATENT DOCUMENTS

WO    2021/121596 A1    6/2021

OTHER PUBLICATIONS

International Search Report issued in International Application No. PCT/EP2021/068459, dated Apr. 19, 2022 (5 pages).

(Continued)

*Primary Examiner* — John A Follansbee
*Assistant Examiner* — Zonghua Du
(74) *Attorney, Agent, or Firm* — Rothwell, Figg, Ernst & Manbeck, P.C.

(57) ABSTRACT

A multi-domain telecommunication network may use a blockchain with an activation block to activate a reserved connection path for a service. The network may use a correction block in the blockchain to efficiently and timely perform a crank-back procedure. A management node of a domain of the network may act as an activation miner send activation messages to management nodes of other domains of the network, the management nodes may perform activation for their respective portions of the connection path reserved by the activation block. The management node acting as the activation miner may verify activation of reserved resources and, in case of failure, generate a correction Block to lock the failed resources and to release the resources affected by the crank-back process. Subsequent blockchain decisions and calculations may reflect the actual status of network resources.

20 Claims, 7 Drawing Sheets

(56) References Cited

U.S. PATENT DOCUMENTS

| | | | |
|---|---|---|---|
| 2015/0215156 A1* | 7/2015 | Yoon | H04L 45/28 |
| | | | 370/225 |
| 2016/0254984 A1 | 9/2016 | Tekalp et al. | |
| 2017/0302539 A1* | 10/2017 | Park | H04L 43/50 |
| 2018/0240165 A1* | 8/2018 | Kilpatrick | G06Q 30/04 |
| 2019/0260714 A1 | 8/2019 | Heo | |
| 2019/0342354 A1* | 11/2019 | Bosch | H04L 41/145 |
| 2020/0029250 A1* | 1/2020 | Ibek | H04L 41/5009 |
| 2020/0053148 A1* | 2/2020 | Motylinski | H04L 41/082 |
| 2020/0167342 A1* | 5/2020 | Shin | H04L 41/0895 |
| 2020/0195495 A1* | 6/2020 | Parker | H04L 41/40 |
| 2020/0241929 A1* | 7/2020 | Arrasjid | G06F 11/3409 |
| 2021/0027260 A1* | 1/2021 | Dent-Young | H04L 63/0823 |
| 2021/0278823 A1* | 9/2021 | Sauer | H04L 9/50 |

OTHER PUBLICATIONS

Karakus, Murat et al., "QoSChain: Provisioning Inter-AS QoS in Software-Defined Networks With Blockchain", IEEE Transactions on Network and Service Management, vol. 18, No. 2, 2021, pp. 1706-1717, XP011860326.

* cited by examiner

DISTRIBUTED SERVICE ACTIVATION METHOD VIA BLOCKCHAIN

CROSS REFERENCE TO RELATED APPLICATION

This application is a 35 U.S.C. § 371 National Phase Entry Application from PCT/EP2021/068459, filed Jul. 5, 2021, designating the United States, the disclosure of which is incorporated herein by reference in its entirety.

TECHNICAL FIELD

This disclosure relates to apparatuses, methods, and systems for authentication of software defined network (SDN) transactions via a distributed ledger technology. In some aspects, the management of the network resources may be improved with the use of special blocks in a blockchain for distributed network coordination based on a blockchain paradigm.

BACKGROUND

Networks with centralized control plane, implemented by a software defined network (SDN) controller, are typically based on the assumption of one SDN controller per each network domain and the hierarchical SDN controller architecture for multi-domain SDN management. One reason for this is that each SDN controller must be fully aligned with its managed network domain. Another reason is the access security within each network domain that is in charge to the SDN controller.

On the other hand, networks with distributed control plane do not scale because the network updates need to be shared across all the managed nodes in order to keep the distributed network topology database aligned.

Blockchain was introduced as a distributed ledger technology for the management of cryptocurrency. Blockchain is designed to protect the transactions via a distributed consensus approach.

SUMMARY

Existing software defined network (SDN) solutions are based on one SDN controller entity per domain, and they can be optionally scaled up with a hierarchical parent controller to coordinate them. This solution has drawbacks because it does not allow for load-sharing between SDN controllers, SDN redundancy, and business continuity in case of SDN controller failure. The parent SDN controller is a single point of failure, and the parent SDN controller cannot be easily hosted and shared across different organizations.

The disadvantages include that, in case of one SDN controller failure, there is no simple way to restart operations by means of an alternate SDN controller. For example, offline backup and restore operations are needed. The disadvantages include that the hierarchical SDN controller (e.g., Abstraction and Control of Traffic Engineered Networks (ACTN)) has no visibility of what happens within each managed domain (e.g., black domains), and the hierarchical SDN controller is not able to migrate control to an alternative parent controller. The disadvantages include that the hierarchical controller approach is not applicable in case of network domains managed by different operators or spanning across different countries. The disadvantages include that, in case of concurrent service requests, there is not a consolidated mechanism to serve requests in parallel over different SDN controllers, so each SDN controller can be a bottleneck.

Blockchain has been used for cryptocurrency management. Blockchain may be used as a distributed consensus mechanism for generic transactions. However, the state-of-art technology does not include such an application for telecommunication networks.

Aspects of the invention may build upon a method to align the topology database of multiple SDN controllers managing a shared network. The method may manage any service creation as a network transaction of which the SDN controllers are notified. In order to reserve the network resources in all the SDN topology databases and prevent resource contention, all (or a majority) of the SDN controllers approve network transaction.

Aspects of the invention may relate to a distributed method to activate the reserved services. In the distributed activation method, all the SDN controllers may collaborate to activate the respective portions of a service, and/or all the SDN controllers may be notified about any failure.

Aspects of the invention may use blockchain smart contracts (e.g., activation blocks (AB)) as a spooling method for the activation of the services. In some aspects, doing so may be beneficial because node communication can take longer than the block creation. Aspects of the invention may use a blockchain correction block (CB) as a crank-back procedure to remove partially activated services and/or prevent the usage of failed resources.

Aspects of the invention may provide the advantage of support for Peer-to-Peer SDN architecture for large network deployments without the need for hierarchical architecture. Aspects of the invention may additionally or alternatively provide the advantage of privacy and security of the network configuration within each SDN domain (e.g., black domain approach). Aspects of the invention may additionally or alternatively provide the advantage of full logging of service activation requests that can be activated in parallel to the blockchain operations. Aspects of the invention may additionally or alternatively provide the advantage of an automated procedure to deal with activation failures that timely and advantageously prevents the usage of unavailable resources until they become available again.

One aspect of the invention may provide a method performed by a first management node of a first domain in a telecommunication network including the first domain and a second domain. The first domain may include the first management node and first network elements (NEs). The second domain may include a second management node and second NEs. One or more resources of one or more of the first NEs and one or more resources of one or more of the second NEs may be part of a connection path reserved by a block in a blockchain public ledger. The method may include adding an activation block to a blockchain public ledger, and the activation block may include activation transactions. The method may include, for each of the one or more first NEs having one or more resources of the reserved connection path, sending the first NE an activation message including one or more of the activation transactions to be performed by the first NE. The method may include sending the second management node an activation message including one or more of the activation transactions.

In some aspects, the one or more activation transactions of the activation message sent to the second management node may include one or more transactions related to one or more external network-to-network interface (E-NNI) ports of one or more of the second NEs. In some aspects, the method may further include sending an activation message including one or more of the activation transactions to a third management mode of a third domain of the telecommunication network, the third domain may include the third management node and third NEs, and one or more resources of one or more of the third NEs may be part of the connection path reserved by the block in the blockchain public ledger.

In some aspects, the method may further include determining that activation of the reserved connection path has failed. In some aspects, determining that activation of the reserved connection path has failed may include receiving an acknowledgement message from a first NE having one or more resources of the reserved connection path and determining that the received acknowledgement message indicates that the first NE failed to perform one or more of the activation transactions. In some aspects, determining that activation of the reserved connection path has failed may include receiving an acknowledgement message from the second management node and determining that the received acknowledgement message indicates a failure of one or more of the activation transactions. In some aspects, the received acknowledgement message may include a list of any successful activation transactions and/or a list of any failed activation transactions. In some aspects, determining that activation of the reserved connection path has failed may include determining that the first management node has not received an acknowledgement message from a first NE having one or more resources of the reserved connection path or from the second management node within a timeout period. In some aspects, the activation block may include an identification of the timeout period.

In some aspects, the method may further include, if activation of the reserved connection path was determined to have failed, performing a crank-back procedure that releases one or more resources of one or more NEs of the reserved connection path. In some aspects, the activation block may include crank-back instructions, and the crank-back procedure may be performed in accordance with the crank-back instructions.

In some aspects, performing the crank-back procedure may include adding a correction block to the blockchain public ledger, and the correction block may include a list of one or more NE resources of the reserved connection path to be released and/or a list of one or more NE resources of the reserved connection path that are not available. In some aspects, the one or more NE resources of the reserved connection path to be released may be one or more NE resources that were successfully activated, and the one or more NE resources of the reserved connection path that are not available may be one or more NE resources that caused the failure of the activation of the reserved connection path. In some aspects, NEs may have successfully performed activation transactions for the one or more NE resources of the reserved connection path to be released, and NEs may have failed to perform activation transactions for the one or more NE resources of the reserved connection path that are not available.

In some aspects, performing the crank-back procedure may include sending deactivation messages to the one or more first NEs having one or more resources of the reserved connection path and to the second management node. In some aspects, the correction block may include a correction block identification (ID), and the deactivation messages may include the correction block ID.

In some aspects, performing the crank-back procedure may include updating a network database of the first domain to identify the one or more NE resources of the reserved connection path to be released as available and/or to identify the one or more NE resources of the reserved connection path that are not available as faulty. In some aspects, the method may further include calculating a new connection path, the one or more released NE resources may be used in calculating the new connection path, and the one or more faulty NE resources may not be used in calculating the new connection path.

In some aspects, the method may further include determining that activation of the reserved connection path has succeeded. In some aspects, determining that activation of the reserved connection path has succeeded may include receiving acknowledgement messages within a timeout period and determining that the acknowledgement messages indicate that all of the activation transactions were successful. In some aspects, the activation block may include an identification of the timeout period. In some aspects, the method may further include, if activation of the reserved connection path was determined to have succeeded, not performing a crank-back procedure that releases one or more resources of one or more NEs of the reserved connection path.

In some aspects, the one or more NE resources of the reserved connection path may include one or more ports.

Another aspect of the invention may provide a first management node of a first domain in a telecommunication network including the first domain and a second domain. The first domain may include the first management node and first network elements (NEs), and the second domain may include a second management node and second NEs. One or more resources of one or more of the first NEs and one or more resources of one or more of the second NEs may be part of a connection path reserved by a block in a blockchain public ledger. The first management node may be adapted to add an activation block to a blockchain public ledger, and the activation block may include activation transactions. The first management node may be adapted to, for each of the one or more first NEs having one or more resources of the reserved connection path, send the first NE an activation message including one or more of the activation transactions to be performed by the first NE. The first management node may be adapted to send the second management node an activation message including one or more of the activation transactions.

In some aspects, the one or more NE resources of the reserved connection path may include one or more ports.

Still another aspect of the invention may provide a method performed by a second management node of a second domain in a telecommunication network including a first domain and the second domain. The first domain may include a first management node and first network elements (NEs), and the second domain may include the second management node and second NEs. One or more resources of one or more of the first NEs and one or more resources of one or more of the second NEs may be part of a connection path reserved by a block in a blockchain public ledger. The method may include adding an activation block to a blockchain public ledger of the second domain, and the activation block may include activation transactions. The method may include receiving an activation message sent by the first management node, and the activation message may include one or more of the activation transactions. The method may include, for each of the one or more second NEs having one or more resources of the reserved connection path, sending the second NE an activation message including one or more of the activation transactions to be performed by the second NE. The method may include receiving acknowledgment messages sent by the one or more second NEs. The method may include determining whether any of the received acknowledgement messages indicate that a second NE failed to perform one or more of the activation transactions with respect to one or more resources of the reserved connection path. The method may include, based on the determination of whether any of the received acknowledgement messages indicate that a second NE failed to perform one or more of the activation transactions, sending an acknowledgement message that indicates whether any of the one or more of the activation transactions failed.

In some aspects, the one or more activation transactions of the activation message sent by the first management node may include one or more transactions related to one or more external network-to-network interface (E-NNI) ports of one or more of the second NEs, and the method may further include adding to one or more of the activation messages sent to the one or more second NEs having one or more resources of the reserved connection path one or more transactions related to one or more intra-domain connections of the second domain. In some aspects, the method may further include adding a correction block to the blockchain public ledger, and the correction block may include a list of one or more NE resources of the reserved connection path to be released and/or a list of one or more NE resources of the reserved connection path that are not available. In some aspects, the one or more NE resources of the reserved connection path to be released may be one or more NE resources that were successfully activated, and the one or more NE resources of the reserved connection path that are not available may be one or more NE resources that caused a failure of an activation of the reserved connection path. In some aspects, NEs may have successfully performed activation transactions for the one or more NE resources of the reserved connection path to be released, and NEs may have failed to perform activation transactions for the one or more NE resources of the reserved connection path that are not available.

In some aspects, the method may further include receiving a deactivation message sent by the first management node. In some aspects, the method may further include updating a network database of the second domain to identify the one or more NE resources of the reserved connection path to be released as available and/or to identify the one or more NE resources of the reserved connection path that are not available as faulty. In some aspects, the method may further include calculating a new connection path, the one or more released NE resources may be used in calculating the new connection path, and the one or more faulty NE resources may not be used in calculating the new connection path.

In some aspects, the one or more NE resources of the reserved connection path may include one or more ports.

Still another aspect of the invention may provide a second management node of a second domain in a telecommunication network including a first domain and the second domain. The first domain may include a first management node and first network elements (NEs), and the second domain may include the second management node and second NEs. One or more resources of one or more of the first NEs and one or more resources of one or more of the second NEs may be part of a connection path reserved by a block in a blockchain public ledger. The second management node may be adapted to add an activation block to a blockchain public ledger of the second domain, and the activation block may include activation transactions. The second management node may be adapted to receive an activation message sent by the first management node, and the activation message may include one or more of the activation transactions. The second management node may be adapted to, for each of the one or more second NEs having one or more resources of the reserved connection path, send the second NE an activation message including one or more of the activation transactions to be performed by the second NE. The second management node may be adapted to receive acknowledgment messages sent by the one or more second NEs. The second management node may be adapted to determine whether any of the received acknowledgement messages indicate that a second NE failed to perform one or more of the activation transactions with respect to one or more resources of the reserved connection path. The second management node may be adapted to, based on the determination of whether any of the received acknowledgement messages indicate that a second NE failed to perform one or more of the activation transactions, send an acknowledgement message that indicates whether any of the one or more of the activation transactions failed.

In some aspects, the one or more NE resources of the reserved connection path may include one or more ports.

Yet another aspect of the invention may provide a method performed by a first management node of a first domain in a telecommunication network including the first domain and a second domain. The first domain may include the first management node and first network elements (NEs). The second domain may include a second management node and second NEs. One or more resources of one or more of the first NEs and one or more resources of one or more of the second NEs may be part of a connection path reserved by a block in a blockchain public ledger. The method may include adding a correction block to the blockchain public ledger. The correction block may include a list of one or more NE resources of the reserved connection path to be released and/or a list of one or more NE resources of the reserved connection path that are not available. The method may include sending deactivation messages to each of the one or more first NEs having one or more resources of the reserved connection path and to the second management node.

In some aspects, the one or more NE resources of the reserved connection path to be released may be one or more NE resources that were successfully activated, and the one or more NE resources of the reserved connection path that are not available may be one or more NE resources that caused a failure of activation of the reserved connection path. In some aspects, NEs may have successfully performed activation transactions for the one or more NE resources of the reserved connection path to be released, and NEs may have failed to perform activation transactions for the one or more NE resources of the reserved connection path that are not available.

In some aspects, the correction block may include a correction block identification (ID), and the deactivation messages may include the correction block ID. In some aspects, the method may further include updating a network database (109-A) of the first domain to identify the one or more NE resources of the reserved connection path to be released as available and/or to identify the one or more NE resources of the reserved connection path that are not available as faulty. In some aspects, the method may further include calculating a new connection path, the one or more released NE resources may be used in calculating the new connection path, and the one or more faulty NE resources may not be used in calculating the new connection path.

Yet another aspect of the invention may provide a first management node of a first domain in a telecommunication network including the first domain and a second domain. The first domain may include the first management node and first network elements (NEs), and the second domain may include a second management node and second NEs. One or more resources of one or more of the first NEs and one or more resources of one or more of the second NEs may be part of a connection path reserved by a block in a blockchain public ledger. The first management node may be adapted to add a correction block to the blockchain public ledger. The correction block may include a list of one or more NE resources of the reserved connection path to be released and/or a list of one or more NE resources of the reserved connection path that are not available. The first management node may be adapted to send deactivation messages to each of the one or more first NEs having one or more resources of the reserved connection path and to the second management node.

Yet another aspect of the invention may provide a computer program comprising instructions for adapting an apparatus to perform the any of the methods above. Still another aspect of the invention may provide a carrier containing the computer program, and the carrier may be one of an electronic signal, optical signal, radio signal, or compute readable storage medium.

Yet another aspect of the invention may provide an apparatus including processing circuitry and a memory. The memory may contain instructions executable by the processing circuitry, and the apparatus may be operative to perform any of the above methods.

Still another aspect of the invention may provide an apparatus adapted to perform any of the methods above.

Yet another aspect of the invention may provide any combination of the claims set forth above.

BRIEF DESCRIPTION OF THE DRAWINGS

The accompanying drawings, which are incorporated herein and form part of the specification, illustrate various embodiments.

DETAILED DESCRIPTION

1. Multi-Domain Telecommunication Network

Figure 1:
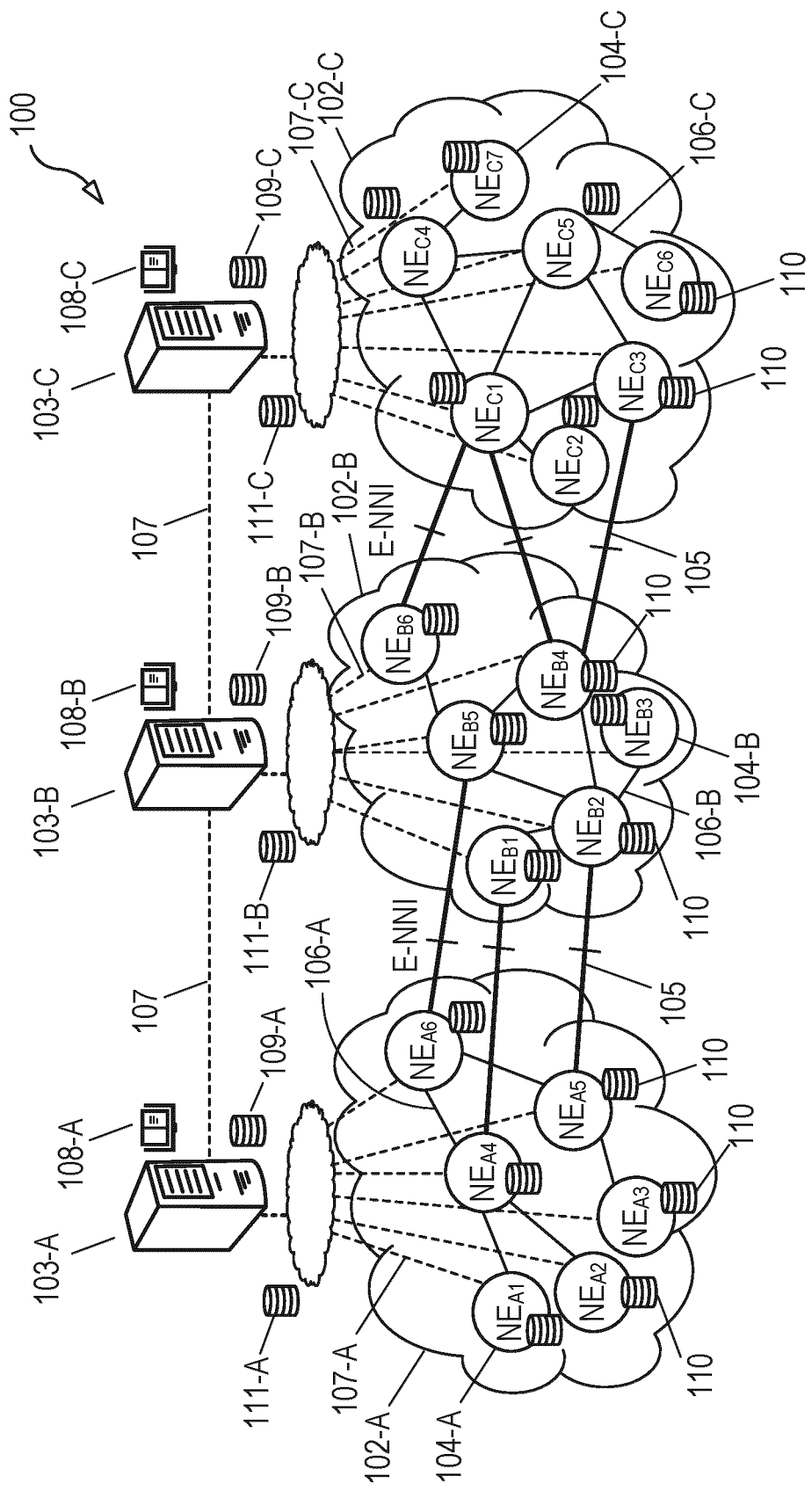
FIG. 1 is a diagram illustrating a multi-domain telecommunication network having blockchain-based network control according to some aspects.

Aspects of the invention may relate to a multi-domain telecommunication network 100 including two or more domains 102 (e.g., a first domain A 102-A, a second domain B 102-B, and a third domain C 102-C). An example of a multi-domain telecommunication network 100 is illustrated in FIG. 1. In some aspects, the telecommunication network 100 may be managed by a pool of management nodes 103 (e.g., management node A 103-A, management node B 103-B, and management node C 103-C). In some aspects, the management nodes 103 may act as miners in blockchain algorithm operations. In some aspects, the management nodes 103 may also act as network controllers (NCs) (e.g., software defined network (SDN) controllers) of their respective domains 102. In some aspects, the assignment of resources in all different domains 102 in which the network 100 is split may be managed through a blockchain approach.

In some aspects, the domains 102 of the telecommunication network 100 may be different from one another. For example, the domains 102 may have different operators, different geographic areas, and/or three different technologies. In some aspects, each domain 102 may be controlled by a network controller (e.g., the management node 103 of the domain 102 acting as a network controller). In some aspects, each domain 102 may include a blockchain public ledger 108, a network database 109, a domain database 111, and a plurality of network elements (NEs) 104. For example, in FIG. 1, the NEs 104 in the first domain A 102-A are generally denoted 104-A and individually denoted $NE_{A1} \ldots NE_{A6}$, respectively, the NEs 104 in second domain B 102-B are generally denoted 104-B and individually denoted $NE_{B1} \ldots NE_{B6}$, respectively, and the NEs 104 in the third domain C 102-C are generally denoted 104-C and individually denoted $NE_{C1} \ldots NE_{C6}$, respectively. In some aspects, one or more of the NEs 104 may be, for example and without limitation, network functions (NFs) (e.g., physical NFs (PNFs) and/or virtual NFs (VNFs)). In some aspects, one or more of the NEs 104 may include NE databases 110. In some aspects, the NEs 104 may be simple relative to the management nodes 103, which may be responsible for managing computationally intensive blockchain algorithm operations.

In some aspects, the telecommunication network 100 may include management connections 107. In some aspects, each management node 103 may have management connections 107 to each of the NEs 104 of its domain 102 (e.g., the first domain A 102-A may include management connections 107-A between the management node 103-A and the NEs 104-A, the second domain B 102-B may include management connections 107-B between the management node 103-B and the NEs 104-B, and the third domain C 102-C may include management connections 107-C between the management node 103-C and the NEs 104-C). In some aspects, the management nodes 103 of the domains 102 may be connected by management connections 107. In some aspects, the management nodes 103 form a pool of network nodes that is able to operate and use "blockchain-like" network coordination.

In some aspects, as shown in FIG. 1, each domain 102 may include intra-domain connections 106, which may connect network elements 104 of the domain 102. For example, the first domain A 102-A may include intra-domain connections 106-A, the second domain B 102-B may include intra-domain connections 106-B, and the third domain C 102-C may include intra-domain connections 106-C. In some aspects, the telecommunication network 100 may include inter-domain connections 105 that connect the domains 102 of the telecommunication network 100. In some aspects, the domains 102 may be interconnected only through some specific interfaces (e.g., external network-to-network interfaces (E-NNIs)). In some aspects, the interface(s) of a domain 102 may be exposed to the management nodes 103 of the other domains 102. In some aspects (e.g., black domain aspects), each management node 103 may have a complete view of the resources of its own domain 102 (e.g., including intra-domain connections 120 between the NEs 104 of the domain 102). In some aspects (e.g., black domain aspects), each management node 103 may only know the "public" interfaces of the other domains 102 (e.g., inter-domain connections 122 and/or inter-domain interfaces such as E-NNIs).

In some aspects, the management nodes 103 may be interconnected through a management network (e.g., including management connections 107). In some aspects, the management nodes 103 may act as a pool in blockchain-based network coordination. In some aspects, the management nodes 103 may have enough computational resources to manage blockchain algorithm operations (e.g., mining). In some aspects, as shown in FIG. 1, each management node 103 may include a copy of the blockchain public ledger 108 (denoted as 108-A, 108-B, and 108-C in domains 102-A, 102-B, and 102-C, respectfully) and a copy of the network database 109 (denoted as 109-A, 109-B, and 109-C in domains 102-A, 102-B, and 102-C, respectfully). In some aspects, network database 109 may be a network topology database (NTD). In some aspects, the network databases 109 may include information about the resources (e.g., ports of NEs 104) shared among the domains 102. In some aspects, use of the blockchain public ledger 108 may enable the copies of the network database 109 stored at the management nodes 103 to be aligned. In some aspects, one or more of the management nodes 103 may have a set of private resources (e.g., ports of NEs 104) that are not shared with the other management nodes 103 and, therefore, are not included in the network database 109. In some aspects, within each network domain 102, the relevant management node 103 may have a domain database 111 with the actual resource availability of the management node 103 constantly updated. In some aspects, within each network domain 102, the NEs 104 may each have a NE database 110 with the actual resource availability of the NE 104 constantly updated. As noted above, the management node 103 of a domain 102 may handle the roles of both miner and network controller for the domain 102. However, in some alternative aspects, the roles of miner and network controller may be separated (e.g., the management node 103 of one or more domains 102 may include a first management node in the role of a miner and a second management node in the role of a network controller, and the first and second management nodes may be separate and distinct network nodes).

2. Example Activation and Crank-Back Procedure

In some aspects, the management nodes 103 of the telecommunication network 100 may handle service requests relating to pool of resources (e.g., resources, such as, for example, ports, of NEs 104) shared by the management nodes 103. In some aspects, a service request may arise from an NE 104 of the telecommunication network 100. In some aspects, the requested services may include connectivity services, such as, for example and without limitation, implementation of Internet Protocol (IP)/Multi-Protocol Label Switching (MPLS) tunnels, Ethernet private Lines, Layer 2 Virtual Private Networks (L2VPNs), and Layer 3 Virtual Private Networks (L3VPNs). In some aspects, the services may include multipoint services based on meshing of multiple peer-to-peer (P2P) services. In some aspects (e.g., radio access network (RAN) scenarios), the services may include radio bearer setup and device connectivity in Internet-of-Things (IOT) networks.

In some aspects, the management nodes 103 may determine an appropriate connection path (e.g., between one or more NEs 103 and including one or more intra-domain connections 106 and/or one or more inter-domain connections 105) for the requested service. In some aspects, determining the connection path for a requested service may include the management nodes 103 reaching a proper consensus on a connection path (e.g., after resolution of a relevant proof of work (POW)). In some aspects, the determined connection path may avoid resource contention issues and/or double-booking of the same resource(s) for different service requests. In some aspects, reaching the consensus may select a connection path among candidate paths. In some aspects, after the management nodes 103 reach the consensus on the connection path, a new block is added to the blockchain, and the management nodes 103 update the blockchain public ledgers 108 and the network databases 109. In some aspects, the new block may include a hash code of the previous block of the blockchain and/or a hashcode of the network databases 109. In some aspects, the updated network databases 109 may include information about the resources (e.g., ports of NEs 104) shared among the domains 102 (including the resources reserved for the requested service). In some aspects, updating the blockchain public ledgers 108 and/or the network databases 109 may reserve the determined connection path for the requested service.

After the connection path is reserved by updating the blockchain public ledgers 108 and/or the network databases 109, the reserved connection path has to be activated in the telecommunications network 100 (e.g., across the different domains 102 of the network 100). In the activation phase, it can happen that one or more resources involved in the path activation, which were reserved in the relevant block of the blockchain, may no longer be available and/or may be in fault (e.g., for any reason). Some aspects of the invention provide a solution to make the management nodes 103 aware immediately of the problem encountered in the activation phase. Some aspects of the invention may additionally or alternatively remove all the resources of the connection path uselessly committed and mark as "not usable" for further mining and/or routing calculations all resources found in fault.

2.1 Smart Blocks

In some aspects, the management nodes 103 may use one or more smart blocks to activate reserved resources and/or to crank-back in the event of activation failure. In some aspects, the one or more smart blocks may include an activation block (AB) and/or a correction block (CB).

In some aspects, the activation block may include instructions (e.g., all of the instructions) for the end-to-end path activation across the whole telecommunication network 100. In some aspects, the path may have been reserved through the blockchain mining process (e.g., via the proof of work (POW) and consensus mechanism among all management nodes 103 acting as miners). In some aspects, the activation block may additionally or alternatively include information identifying what must be done in case of path activation failure. In some aspects, the information identifying what must be done in case of path activation failure may include the indications for crank-back operations and/or the relevant correction block generation.

In some aspects, the correction block may be generated only in case of failure of the activation of the committed path. In some aspects, the correction block may allow restoration (e.g., immediate restoration) of the reserved resources of the connection path in the network database 109. In this way, the network databases 109 may be updated to reflect the release of the previously reserved resources (e.g., so that the network databases 109 are up-to-date when used by the management nodes 103 in future calculations such as mining and/or routing calculations). In some aspects, the correction block may additionally or alternatively allow the resources that have caused the activation failure (e.g., because they are no longer available and/or are in fault) to be marked as not available. In some aspects, the marking of the resources that caused the activation failure may provide the benefit of making resources found to be in fault during the attempted activation immediately not usable by the management nodes 103 (even though those resources may still be considered as valid in the network database 109).

2.2 Activation Tasks

In some aspects, one of the management nodes 103 may act as an activation miner. In some aspects, the activation miner may be the management node 103 that processed the connection request. However, this is not required, and, in some alternative aspects, a different management node 103 (e.g., a management node 103 chosen by an election mechanism carried out by the management nodes 103) may act as the activation miner. In some aspects, the management node 103 acting as the activation miner may perform one or more steps of the activation and crank-back process 200 illustrated in FIG. 2.

Figure 2:
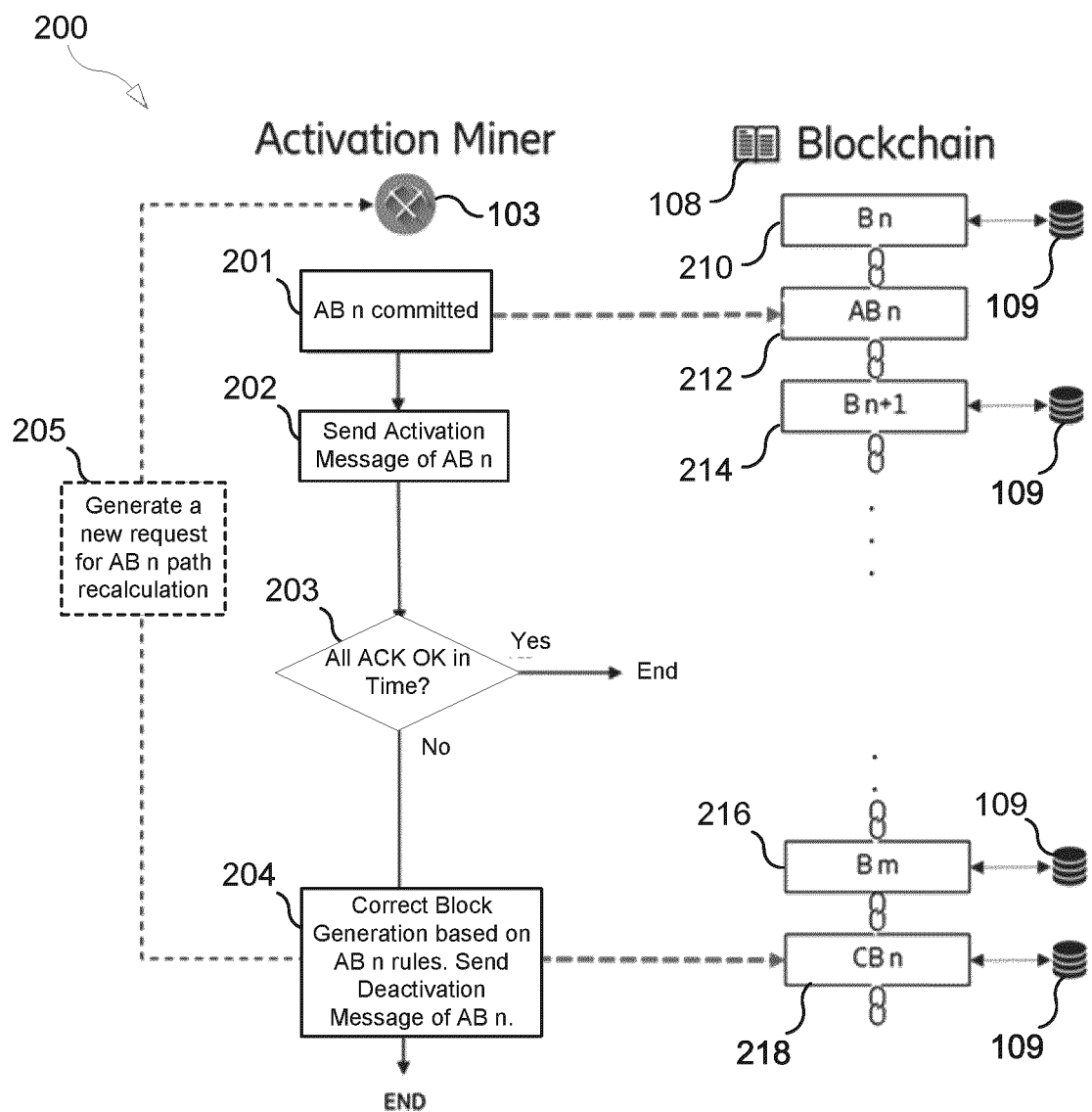
FIG. 2 is a flowchart illustrating an activation and crank-back process according to some aspects.

In some aspects, as shown in FIG. 2, the activation and crank-back process 200 may be performed after the management nodes 103 of the network 100 (acting as miners) in response to a request have (i) determined a connection path through a blockchain mining process (e.g., via the proof of work (POW) and consensus mechanism amount the management nodes 103 of the network 100), (ii) reserved the relevant resources of the determined connection path by generating a block n (Bn) 210 of the blockchain, (iii) updated the copies of the blockchain public ledger 108 to include the Bn 210, and (iv) updated the copies of the network database 109 to include the reserved resources of the connection in the resources indicated as being shared among the domains 102.

In some aspects, as shown in FIG. 2, the activation and crank-back process 200 may include a step 201 in which the management node 103 acting as the activation miner generates an activation block n (ABn) 212 and adds the ABn 212 to the blockchain (e.g., by updating the blockchain public ledger 108). In some aspects, ABn 212 may include instructions to follow in case of activation failure and/or timeout indications. In some aspects, the timeout indications may indicate how long to wait for the connection to actually be established in the network 100 before the activation is considered to have failed.

In some aspects, as shown in FIG. 2, the activation and crank-back process 200 may include a step 202 in which the management node 103 acting as the activation miner sends an activation message to the management nodes 103 of all of the domains 102 involved in the path activation. In some aspects, the activation message may be related to the ABn 212 (e.g., the activation method may include an identification (ID) number of the ABn 212). In some aspects, each of the management nodes 103 that receive the activation message may be responsible for internal activation of the connection path within the domain 102 of the management node 103 (including all NEs 104 of domain 102 necessary for the connection path).

In some aspects, as shown in FIG. 2, the activation and crank-back process 200 may include a step 203 in which the management node 103 acting as the activation miner waits to receive an acknowledge message (ACK) from all the management nodes 103 involved in the path activation. In some aspects, the step 203 may include the management node 103 acting as the activation miner activating an appropriate timer function (e.g., to avoid waiting for an indefinite time). In some aspects, if all the expected ACKs (e.g., one for each connection collected by management node 103 involved) arrived in time and are all positive (e.g., indicating that no failure was encountered during the activation process), no other action is required, and the verification on the ABn 212 in the blockchain may be concluded (e.g., as shown in FIG. 2, if Yes, the activation and crank-back process 200 may proceed from step 203 to END). In some aspects, if all of the expected ACKs do not arrive in time and/or if any are negative (e.g., indicating a failure in the activation and crank-back process 200), a correction process may be initiated by proceeding from step 203 to a step 204.

In some aspects, as shown in FIG. 2, the activation and crank-back process 200 may include a step 204 in which the management node 103 acting as the activation miner recovers the information related to the resources in the connection path from the Bn 210 of the blockchain public ledger 108. In some aspects, the step 204 may include the management node 103 acting as the activation miner sending a deactivation message in the network 100 (e.g., to the management nodes 103 of all of the domains 102 that were involved in the attempted path activation). In some aspects, the step 204 may include the management node 103 acting as the activation miner generating correction block n (CBn) 218. In some aspects, the management node 103 acting as the activation miner may communicate the CBn 218 to the other management nodes 103 of the telecommunication network 100.

In some aspects, the management nodes 103 may update the blockchain public ledgers 108 to include the CBn 218. In some aspects, the management nodes 103 may update the network databases 109 (e.g., so that resources reserved for the connection path will be newly available in the network databases 109 and/or so that those resources that have caused the activation failure will be marked as not available. In some aspects, the management nodes 103 may not use the resources marked as not available in subsequent calculations (e.g., mining and/or routing calculations) to avoid the resources that caused the activation failure from being used again and causing recurrent faulty conditions. In some aspects, the resources marked as faulty through the CBn 218 may become again available in the telecommunication network 100 according to the ordinary network housekeeping processes (e.g., scheduled or triggered by particular events), with related network database 109 and local database realignment. In some aspects, the addition of the CBn 218 may result in the blockchain public ledger 108 and the associated network database 109 being timely updated to reflect the actual status of the network 100.

In aspects, as shown in FIG. 2, the blockchain may include one or more blocks (e.g., block n+1 (Bn+1) 214 and/or block m (Bm) 216), which may have been generated subsequent to generation of the Bn 210 and the ABn 212. In some aspects, neither mining nor consensus may be required for the CBn 218. In some aspects, the other management nodes 103 may perform only a verification process on the CBn 218 to check that the CBn 218 is well formatted and/or was actually sent from the management node 103 that generated the ABn 212).

In some aspects, as shown in FIG. 2, the activation and crank-back process 200 may include an optional step 205 in which the management node 103 acting as the activation miner reiterates (e.g., automatically) the request related to the failed transaction of the ABn 212 and generates a new request. In some aspects, the new request may be queued on top of the others requests. In some aspects, because the resources that caused the activation failure of the connection path reserved for the previous request are marked as not available, those resources will not be used in the mining calculations to determine a connection path for the new request, and the network 100 may avoid falling into the same problem(s) when attempting to activate resources of a connection path reserved for the new request. In some alternative aspects, the NE 104 that originally made the request (as opposed to the management node 103 that acted as the activation miner) may be in charge of determining whether or not to reiterate the request. In some other alternative aspects, the activation block n (ABn) may indicate whether the management node 103 acting as the activation miner should automatically reiterate the request (and may also indicate how many times) in case of failure or if the management node 103 acting as the activation miner should turn back to the NE 104 that originally made the request to make the decision.

2.3 Recovery from Activation Miner Failure

In some aspects, all the information about the path activation and also the indications to be followed in case of activation failure may be recorded immutably in the blockchain, which is common to all management nodes 103 (e.g., via the blockchain public ledgers 108). In some aspects, this may allow protection from a failure of the management node 103 acting as the activation miner.

In some aspects, after an established timeout period, if the NE 104 that originally made the request still does not have the path activated, the NE 104 may send a new request to the same pool of management nodes 103 related to the original request. In some aspects, the management nodes 103 may verify whether the blockchain includes a correction block corresponding to the original request. If the blockchain does not include a correction block corresponding to the original request, the management nodes 103 may infer that the management node 103 acting as the activation miner did not conclude its work (e.g., due to the management node 103 acting as the activation miner going offline before concluding the work), and the management nodes 103 may elect another management node 103 to act as the activation miner in the pool (in place of the failed management node 103 that was originally in charge of the activation).

3. Activation Block

In some aspects, the management node 103 acting as the activation miner may add the activation block (AB) to the blockchain to activate the path whose resources have been reserved. In some aspects, the AB may be, in effect, an agreement between the management nodes 103 that gave their consensus to the path chosen to satisfy a connection request. In some aspects, the AB is irrevocable/binding because of the blockchain system. In some aspects, the AB may include a logical sequence of actions triggered by certain events.

Table 1 below provides an example of the structure of each AB in the blockchain according to some aspects. In some aspects, each AB may include one or more of the fields shown in Table 1 below.

TABLE 1

Activation block structure

| Field | Meaning |
| --- | --- |
| Version | This is the version of the Software in use |
| Service ID | This is the ID of the service connection request |
| Activation block ID | This is the unique address of the activation block |
| Previous Block hash | This is the hash code of the previous block of the chain in the Ledger |
| Common database (CdB) hash | This is the hash code of the CdB at block creation |
| Timestamp | This is the timestamp of the block creation |
| Counterparts involved in the contract | Network controllers or miners involved in the route activation. |
| Contract terms | Put, get, SW functions, global/static variables. Conditions for execution (If . . . Then). Dictate actions or changes based on conditions met. |
| Events that trigger execution | Reserved resources for the new path Acknowledge messages from NE/NC/Miner Failure of the activation of the committed path Not available resources Re-usable resources |
| Consequential actions | No action in case of connection request fulfilled Correction block generation in case of failed activation |

In some aspects the common database (CdB) may be the network database 109.

In some aspects, the activation block may include get and put transactions relevant to network resources involved in the route object of the proof of work. In some aspects, a get may represent a query to retrieve information about the current state of a node's resource. In some aspects, a put may require the network node within the domain 102 of the management node 103 acting as the activation miner or the management node 103 of other domains 102 to perform activities relevant to the activation of the route object of the proof of work.

In some aspects, the management node 103 acting as the activation miner may get an acknowledge message from the NEs 104 within its domain 102 or from management nodes 103 of other domains 102 about the actions that they should have performed.

In some aspects, depending on the content of the acknowledge message, the management node 103 acting as the activation miner may execute the contract conditions (if . . . then) and/or dictate actions or changes based on conditions met.

In some aspects, if the route of the proof of work will not be feasible, the management node 103 acting as the activation miner may provide new information about the network resources in an additional correction block.

4. Correction Block

Table 2 below provides an example of the structure of each correction block (CB) in the blockchain according to some aspects. In some aspects, each CB may include one or more of the fields shown in Table 2 below.

TABLE 2

Correction block structure

| Field | Meaning |
| --- | --- |
| Version | This is the version of the Software in use |
| Service ID | This is the ID of the service connection request |
| Activation block ID | This is the unique address of the activation block |
| Previews Block hash | This is the hash code of the previous block of the chain in the Ledger |
| CdB hash | This is the hash code of the CdB at block creation |
| Timestamp | This is the timestamp of the block creation |
| Transaction status | This is the status of each transaction: Not available resources (the network resource that are in a fault status and are not available for future routing) Resources to be released (the network resources that had been committed but which must be released because the activation of the path was not successful. The released resources will be available for future routing) Other (future use) |
| Transaction Details | These are the details to explain the status of the network resource and relevant modification performed (cost or other, in accordance to the resource "status"). |
| No. of transactions | This is the sequential ID number of the transactions in the Correction Block |

In some aspects, the correction block may be generated by the management node 103 acting as the activation miner in case of failure in implementing the route which is object of the poof of work. In some aspects, the correction block may be added to the blockchain following a validation process of the management node 103.

In some aspects, the correction block may include the ID of the service request and/or the ID of the activation block that generated the correction block. In some aspects, the service request ID and the activation block ID may enable the service request fulfillment process to be reconstructed starting from the connection request of a network element 104, passing through its activation, up to crank-back.

In some aspects, the correction block may list the resources that are not available and will not be used in the subsequent routing calculations. In some aspects, the correction block may list the resources that had been committed/reserved but which must be released because the activation of the path was not successful, and the resources can be used again in future routing calculations.

In some aspects, the "transaction details" field of the correction block may include the reasons for the status of each resource involved in the path to be exported. In some aspects, for the resources in failure, this information may be used for further data analytics and reporting (statistics, machine learning, etc.).

5. Message Formats

Figure 3:
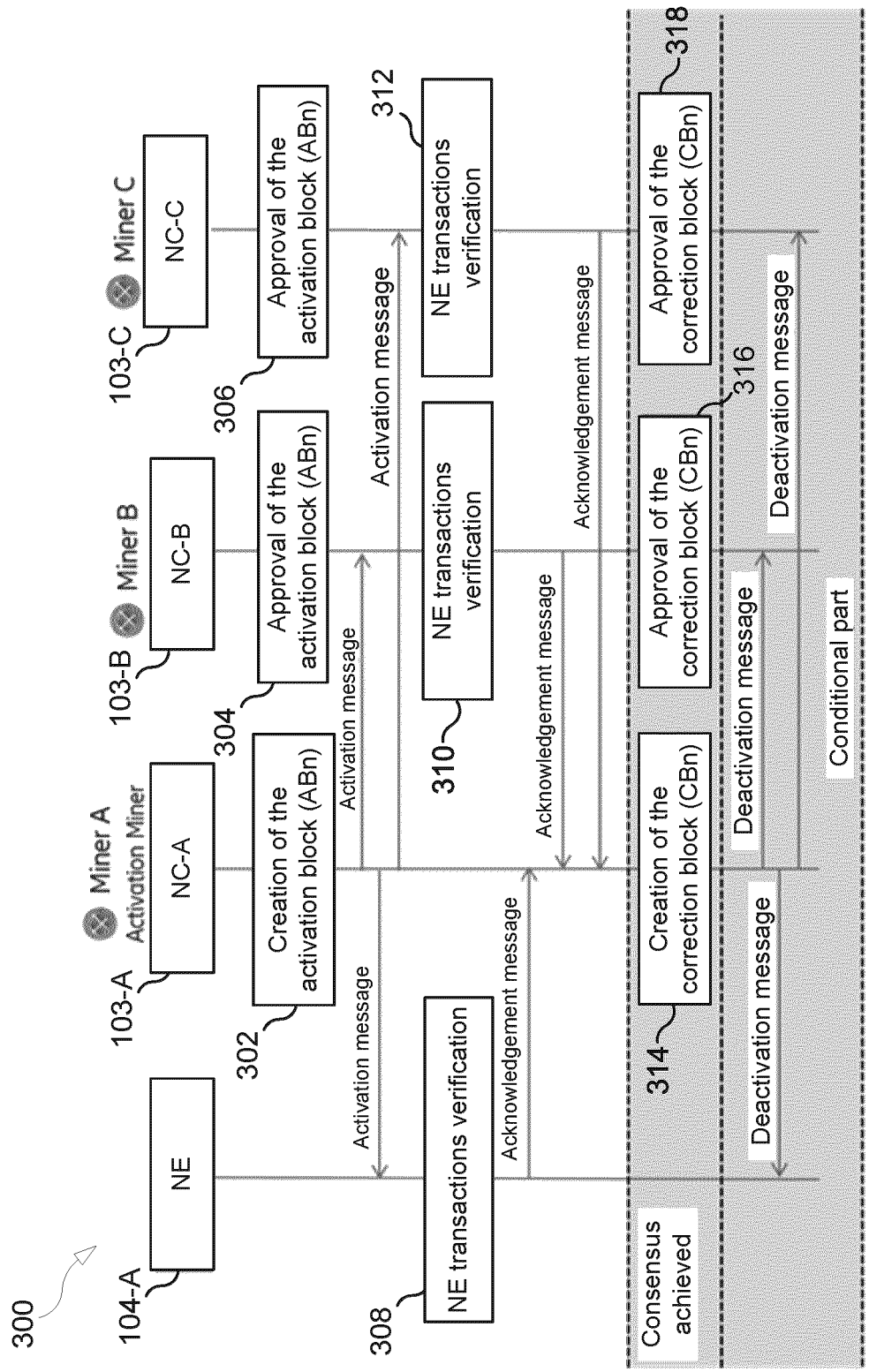
FIG. 3 is a flowchart illustrating an activation and crank-back process according to some aspects.

FIG. 3 is a flowchart illustrating an activation and crank-back process 300 according to some aspects. The flowchart of FIG. 3 is based on the Unified Modeling Language (UML). The flowchart of FIG. 3 illustrates the exchange of messages in the telecommunications network 100 according to some aspects. In the example illustrated in FIG. 3, the management node A 103-A of the first domain A 102-A acts as the activation miner that has assumed the role of activating the reserved resources on the chosen connection path, and one or more NEs 104-A are NEs 104-A of the first domain A 102-A.

In some aspects, the activation and crank-back process 300 may be performed after the management nodes 103 of the network 100 (acting as miners) in response to a request (e.g., from an NE 104) have (i) determined a connection path through a blockchain mining process (e.g., via the proof of work (POW) and consensus mechanism amount the management nodes 103 of the network 100), (ii) reserved the relevant resources of the determined connection path by generating a block n (Bn) of the blockchain (see, e.g., Bn 210 of FIG. 2), (iii) updated the copies of the blockchain public ledger 108 to include the Bn, and (iv) updated the copies of the network database 109 to include the reserved resources of the connection in the resources indicated as being shared among the domains 102. In some aspects, although resources have been reserved for the path, the resources may not have been committed.

In some aspects, as shown in FIG. 3, the activation and crank-back process 300 may include a step 302 in which the management node A 103-A generates an activation block n (ABn) (see, e.g., ABn 212 of FIG. 2). In some aspects, as shown in FIG. 3, the activation and crank-back process 300 may include steps 304 and 306 in which the management node B 103-B and the management node C 103-C, respectively, approve the ABn. In some aspects, the management nodes 103-A, 103-B, and 103-C may add the ABn to the blockchain (e.g., by updating the blockchain public ledgers 108).

In some aspects, as shown in FIG. 3, after the creation of the activation block, the management node A 103-A acting as the activation miner may send activation messages to a network element 104-A belonging to the first network domain A 102-A and to the management nodes 103-B and 103-C of the other domains (e.g., the second domain B 102-B and the third domain C 103-C) that have been chosen for the path activation. In some aspects, each of the management nodes 103-B and 103-C of the other domains involved in the activation path may forward the activation message they received from the management node A 103-A acting as the activation miner to all of the relevant NEs 104 inside their domains.

In some aspects, the activation message that the management node A 103-A acting as the activation miner sends to the management nodes 103-B and 103-C of the other domains 102-B and 102-C may only include activation requests for E-NNI transactions (e.g., activation requests for inter-domain connections 105). In some aspects, because the management nodes 103-B and 103-C of the other domains 102-B and 102-C participated in the choice of the path to be activated, the management nodes 103-B and 103-C of the other domains 102-B and 102-C may be aware of the transactions (e.g., intra-domain connections 106) to be activated in its domain, and the management nodes 103-B and 103-C of the other domains 102-B and 102-C may add network-to-network interface (NNI) transactions to the activation message that the management nodes 103-B and 103-C sends to the NEs 104 of their domains 102.

In some aspects, the activation message may include all the transactions to be implemented to activate the path.

Table 3 below provides an example of the structure of the activation message according to some aspects. In some aspects, the activation message may include one or more of the fields shown in Table 3 below.

TABLE 3

Activation Message structure

| Field | Meaning |
| --- | --- |
| Version | This is the version of the Software in use |
| Message ID | This is the ID of the message |
| Service ID | This is the ID of the service connection request |
| Activation block ID | This is the ID of the Activation Block n (ABn) |
| Source ID | This is the ID of the NC/miner that sent the activation request. It will be used by the NE/NC/Miner to answer the activating message. |
| Destination ID | ID of the destination NE/NC/Miner |
| Timestamp | This is the timestamp of the activation request |
| Request Type | This is the type of the request conveyed by the message: Service activation |
| Request Detail | This is the detail of the modifications requested (service activation) in accordance to the "Request Type". |
| No. of transactions | This is the sequential number of the transactions to be completed. |

In some aspects, as shown in FIG. 3, the activation and crank-back process 300 may include steps 308, 310, and 312 in which the network elements (NEs) verify whether it is possible to implement the transactions included in the activation messages and reply with an acknowledge message to the management node 103 that sent the activation message within their domains 102. If the management node 103 that sent the activation message within the domain 102 of the NE 104 is not the management node A 103-A acting as activation miner, the management node B or C 103-B or 103-C may forward the acknowledge message to the management node A 103-A acting as activation miner.

For example, in some aspects, in step 308, the one or more relevant NEs 104-A of the first domain A 102-A may verify whether it is possible to implement the transactions included in the activation message and reply to the management node A 103-A with an acknowledge message. In some aspects, in step 310, the one or more relevant NEs 104-B of the second domain B 102-B may verify whether it is possible to implement the transactions included in the activation message, reply to the management node B 103-B with an acknowledge message, and the management node B 103-B may forward the acknowledge message to the management node A 103-A acting as activation miner. In some aspects, in step 312, the one or more relevant NEs 104-C of the third domain C 102-C may verify whether it is possible to implement the transactions included in the activation message, reply to the management node C 103-C with an acknowledge message, and the management node C 103-C may forward the acknowledge message to the management node A 103-A acting as activation miner.

In some aspects, the acknowledge message may include two lists of transactions. In some aspects, the first list may include all transactions that have been successful, and the second list may contain the transactions that for some reason could not be implemented. In some aspects, the acknowledge message may include a field that reports, for each failed transaction, the reason for the failure of the transaction to be implemented. In some aspects, the reasons for failure field may allow the creation of useful statistics that can be used to evaluate the cost of the resource and/or for any network upgrades. In some aspects, a management node 103 (e.g., management node B 103-B and/or management node 103-C) that is not acting as the activation miner may forward the lists of E-NNI that have been successful activated or failed to the management node A 103-A acting as activation miner.

Table 4 below provides an example of the structure of the acknowledge message according to some aspects. In some aspects, the acknowledge message may include one or more of the fields shown in Table 4 below.

TABLE 4

Acknowledge Message structure

| Field | Meaning |
| --- | --- |
| Version | This is the version of the Software in use |
| Message ID | This is the ID of the message |
| Service ID | This is the ID of the service connection request |

TABLE 4-continued

Acknowledge Message structure

| Field | Meaning |
| --- | --- |
| Activation block ID | This is the ID of the Activation Block n (ABn) |
| Source ID | This is the ID of the Network element/NC/miner that sends the acknowledge answer. |
| Destination ID | ID of the destination NC/Miner |
| Timestamp | This is the timestamp of the acknowledge answer |
| Request Type | This is the type of the request conveyed by the message: Acknowledge |
| N. of transactions | This is the sequential number of the transactions to be completed |
| List of successful transactions | This is the list of the successful transactions. |
| List of failed transactions | This is the list of the failed transactions |
| Reasons for failure | This is the list of reasons of failure for each failed transaction |
| Cost Function | This field can optionally specify the changed cost for a resource based on the number of failures |

In some aspects, as shown in FIG. 3, the activation and crank-back process 300 may include a step 314 in which, if the activation of some transactions has failed, the management node A 103-A generates a correction block n (CBn) (see, e.g., CBn 218 of FIG. 2). In some aspects, the CBn may include the status of each resource. In some aspects, as shown in FIG. 3, the activation and crank-back process 300 may include steps 316 and 318 in which the management node B 103-B and the management node C 103-C, respectively, approve the CBn. In some aspects, the management nodes 103-A, 103-B, and 103-C may add the CBn to the blockchain (e.g., by updating the blockchain public ledgers 108). In some aspects, the steps 314, 316, and 318 may be conditional because, if the path activation is successful, the steps 314, 316, and 318 will not be implemented.

In some aspects, the correction block may include a list of successful resources that have to be released and/or a complete list of not available resources that should not be used in subsequent routing calculations.

In some aspects, as shown in FIG. 3, after the creation of the correction block, the management node A 103-A acting as activation miner will send deactivation messages to the network elements (NEs) 104-A within its domain 102-A and to the management nodes 103 (e.g., management node B 103-B and management node C 103-C) in the other domains 102 involved in the path activation (e.g., the second domain B 102-B and the third domain C 102-C). In some aspects, the deactivation message that the management node A 103-A acting as activation miner sends to the management nodes 103 (e.g., management node B 103-B and management node C 103-C) of other domains 102 may include information about E-NNI transactions (and not information about NE transactions for NEs 104 within the other domain 102). In some aspects, the management nodes 103 (e.g., management node B 103-B and management node C 103-C) of the other domains 102 may perform the deactivation transactions within its domain 102 (e.g., deactivating NEs 104 of the domain 102). In some aspects, the management nodes 103 (e.g., management node B 103-B and management node C 103-C) of the other domains 102 that receive the deactivation messages may be the same management nodes 103 that sent the acknowledge messages to the management node A 103-A acting as activation miner (e.g., in steps 310 and 312), so the management nodes 103 of the other domains 102 may be aware of the status of resources in their domains 102.

Table 5 below provides an example of the structure of the deactivation message according to some aspects. In some aspects, the deactivation message may include one or more of the fields shown in Table 5 below.

TABLE 5

Deactivation Message structure

| Field | Meaning |
| --- | --- |
| Version | This is the version of the Software in use |
| Message ID | This is the ID of the message |
| Service ID | This is the ID of the service connection request |
| Correction block ID | This is the ID of the Correction Block n (CBm) |
| Source ID | This is the ID of the NC/miner that sent the deactivation request. |
| Destination ID | ID of the destination NE/NC/Miner |
| Timestamp | This is the timestamp of the request creation |
| Request Type | This is the type of the request conveyed by the message: Service deactivation |
| Request Detail | This is the detail of the modification requested (service deactivation) in accordance to the "Request Type". |
| Cost Function | This field can optionally specify which is the cost function to be adopted in the solution |
| No. of transactions | This is the sequential number of the transactions to be completed |

6. Cloud Implementation

Aspects of the invention may be implemented on the cloud (e.g., based on the implementation of the management nodes 103 acting as SDN controllers).

7. Flowcharts

Figure 4:
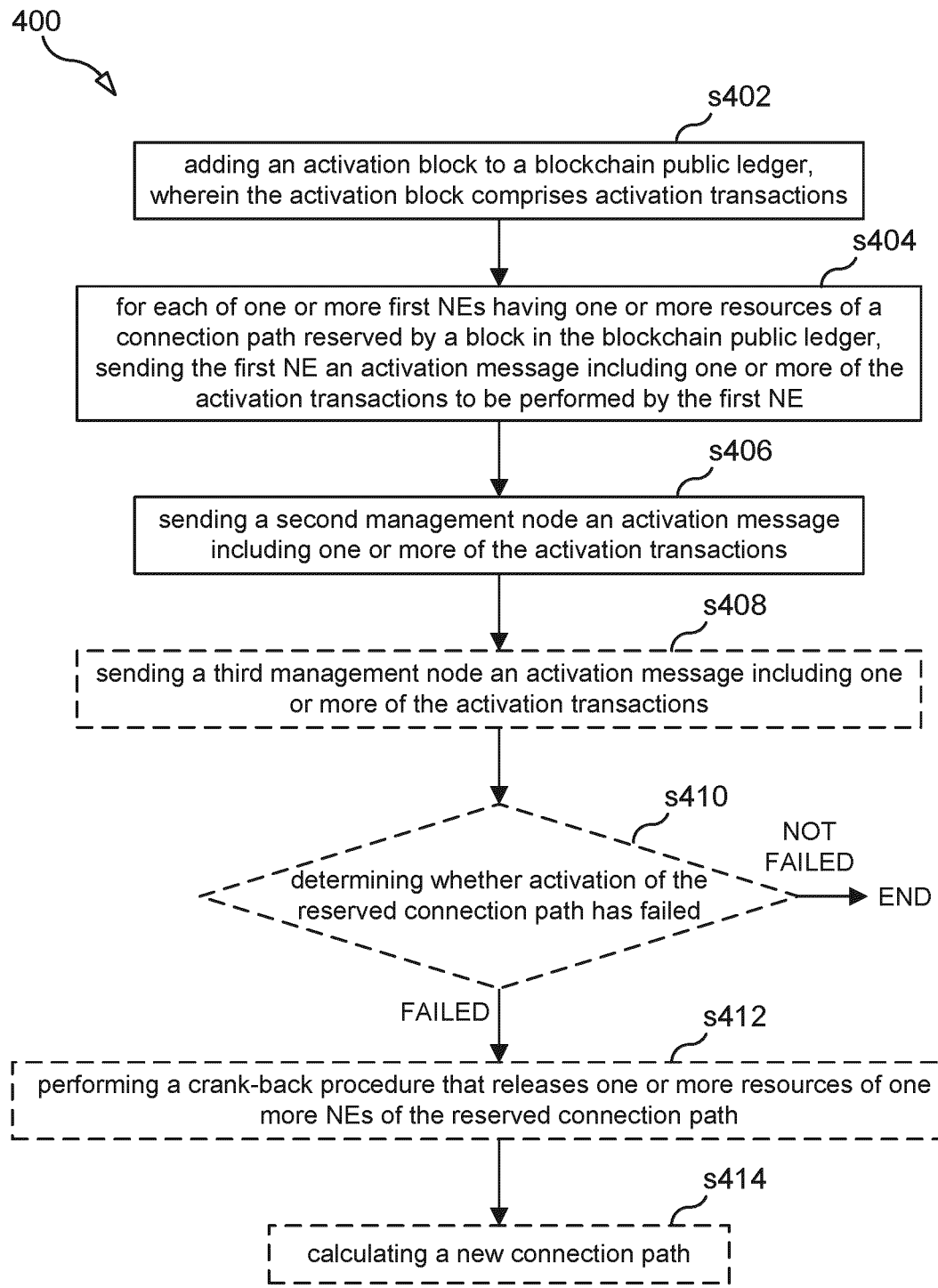
FIG. 4 is a flow chart illustrating a process performed by a management node acting as an activation miner according to some aspects.

FIG. 4 illustrates a process 400 performed by a first management node 103-A of a first domain 102-A in a telecommunication network 100 including the first domain 102-A and a second domain 102-B. The first domain 102-A may include the first management node 103-A and first network elements (NEs) 104-A. The second domain 102-B may include a second management node 103-B and second NEs 104-B. One or more resources of one or more of the first NEs and one or more resources of one or more of the second NEs may be part of a connection path reserved by a block 210 in a blockchain public ledger 108-A. In some aspects, the one or more NE resources of the reserved connection path may include one or more ports. In some aspects, in carrying out the process 400, the first management node 103-A may be acting as an activation miner to initiate activation of the connection path reserved by the block 210.

In some aspects, the process 400 may include a step 402 in which the first management node 103-A adds an activation block 212 to a blockchain public ledger 108-A. In some aspects, the activation block may include activation transactions.

In some aspects, the process 400 may include a step 404 in which the first management node 103-A, for each of the one or more first NEs 104-A having one or more resources of the reserved connection path, sends the first NE 104-A an activation message including one or more of the activation transactions to be performed by the first NE 104-A.

In some aspects, the process 400 may include a step 406 in which the first management node 103-A sends the second management node an activation message including one or more of the activation transactions. In some aspects, the one or more activation transactions of the activation message sent to the second management node 103-B may include one or more transactions related to one or more external network-to-network interface (E-NNI) ports of one or more of the second NEs 104-B.

In some aspects, the process 400 may include an optional step 408 in which the first management node 103-A sends an activation message including one or more of the activation transactions to a third management mode 103-C of a third domain 102-C of the telecommunication network 100. In some aspects, the third domain 102-C may include the third management node 103-C and third NEs 104-C, and one or more resources of one or more of the third NEs 104-C may be part of the connection path reserved by the block 210 in the blockchain public ledger 108-A. In some aspects, the optional step 408 may additionally include the management node 103-A sending an activation message to any other management node 103 of a domain 102 having one or more NEs 104 with one or more resources of the reserved connection path. In some aspects, the optional step 408 may be repeated for each additional management node 103 of a domain 102 having one or more resources of the reserved connection path.

In some aspects, the process 400 may include an optional step 410 in which the first management node 103-A determines whether activation of the reserved connection path has failed. In some aspects, determining whether activation of the reserved connection path has failed may include receiving an acknowledgment message from each of the one or more first NEs 104-A having one or more resources of the reserved connection path. In some aspects, determining whether activation of the reserved connection path has failed may additionally or alternatively include receiving acknowledgement messages from each of the one or more other management nodes 103 (e.g., the second management node 103-B) of one or more domains 102 (e.g., the second domain 102-B) having one or more NEs 104 (e.g., one or more second NEs 104-B) having one or more resources of the reserved connection path. In some aspects, the received acknowledgement messages may include a list of any successful activation transactions and/or a list of any failed activation transactions.

In some aspects, in the optional step 410, the first management node 103-A may determine that activation of the reserved connection path has succeeded. In some aspects, determining that activation of the reserved connection path has succeeded in optional step 410 may include the first management node 103-A receiving acknowledgement messages within a timeout period and determining that the acknowledgement messages indicate that all of the activation transactions were successful. In some aspects, the activation block 212 may include an identification of the timeout period. In some aspects, if activation of the reserved connection path was determined to have succeeded in the optional step 410, the first management node 103-A may not performing a crank-back procedure that releases one or more resources of one or more NEs 104 (e.g., one or more first NEs 104-A, one or more second NEs 104-B, and/or one or more third NEs 104-C) of the reserved connection path.

In some aspects, in the optional step 410, the first management node 103-A may determine that activation of the reserved connection path has failed. In some aspects, determining that activation of the reserved connection path has failed in optional step 410 may include the first management node 103-A receiving an acknowledgement message from a first NE 104-A having one or more resources of the reserved connection path and determining that the received acknowledgement message indicates that the first NE 104-A failed to perform one or more of the activation transactions. In some aspects, determining that activation of the reserved connection path has failed in optional step 410 may additionally or alternatively include the first management node 103-A receiving an acknowledgement message from the second management node 1043-B and determining that the received acknowledgement message indicates a failure of one or more of the activation transactions. In some aspects, determining that activation of the reserved connection path has failed in optional step 410 may additionally or alternatively include the first management node 103-A determining that the first management node 103-A has not received an acknowledgement message from a first NE 1040A having one or more resources of the reserved connection path or from another management node 103 (e.g., the second management node 103-B) of a domain 102 (e.g., the second domain 102-B) having one or more NEs 104 (e.g., one or more second NEs 104-B) having one or more resources of the reserved connection path within a timeout period. In some aspects, the activation block 212 may include an identification of the timeout period.

In some aspects, the process 400 may include an optional step 412 in which the first management node 103-A, if activation of the reserved connection path was determined to have failed in the optional step 410, performs a crank-back procedure that releases one or more resources of one or more NEs 104 of the reserved connection path. In some aspects, the activation block 212 may include crank-back instructions, and the crank-back procedure may be performed in accordance with the crank-back instructions.

In some aspects, the optional step 412 may include the first management node 103-A adding a correction block 218 to the blockchain public ledger 108-A. In some aspects, the correction block 218 may include a list of one or more NE resources of the reserved connection path to be released and/or a list of one or more NE resources of the reserved connection path that are not available. In some aspects, the one or more NE resources of the reserved connection path to be released may be one or more NE resources that were successfully activated, and the one or more NE resources of the reserved connection path that are not available may be one or more NE resources that caused the failure of the activation of the reserved connection path. In some aspects, NEs 104 may have successfully performed activation transactions for the one or more NE resources of the reserved connection path to be released, and NEs 104 may have failed to perform activation transactions for the one or more NE resources of the reserved connection path that are not available.

In some aspects, performing the crank-back procedure in the optional step 412 may include the first management node 103-A sending deactivation messages to the one or more first NEs 104-A having one or more resources of the reserved connection path and to the second management node. In some aspects, the correction block may include a correction block 218 identification (ID), and the deactivation messages may include the correction block ID.

In some aspects, performing the crank-back procedure may include updating the network database 109-A of the first domain 102-A to identify the one or more NE resources of the reserved connection path to be released as available and/or to identify the one or more NE resources of the reserved connection path that are not available as faulty.

In some aspects, the process 400 may include an optional step 414 in which the first management node 103-A calculates a new connection path. In some aspects, the one or more released NE resources (e.g., released in the optional step 412) may be used in calculating the new connection path, and the one or more faulty NE resources may not be used in calculating the new connection path.

Figure 5:
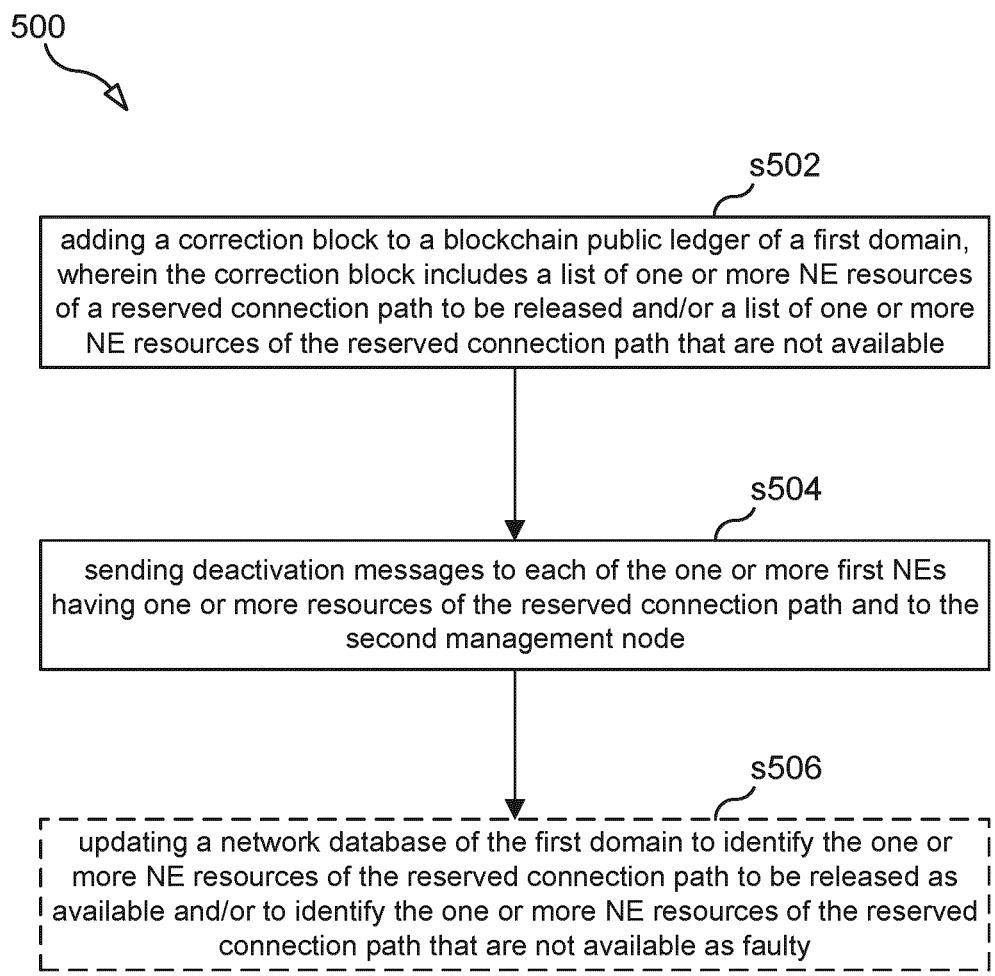
FIG. 5 is a flow chart illustrating a crank-back process performed by a management node according to some aspects.

FIG. 5 illustrates a process 500 performed by a first management node 103-A of a first domain 102-A in a telecommunication network 100 including the first domain 102-A and a second domain 102-B. The first domain 102-A may include the first management node 103-A and first network elements (NEs) 104-A. The second domain 102-B may include a second management node 103-B and second NEs 104-B. One or more resources of one or more of the first NEs and one or more resources of one or more of the second NEs may be part of a connection path reserved by a block 210 in a blockchain public ledger 108-A. In some aspects, the one or more NE resources of the reserved connection path may include one or more ports. In some aspects, the one or more steps of the process 500 may be performed in the optional step 412 of the process 400 shown in FIG. 4. In some aspects, in carrying out the process 500, the first management node 103-A may be performing a crank-back procedure to release resources of the connection path reserved by the block 210 after an unsuccessful attempt to activate the connection path reserved by the block 210.

In some aspects, the process 500 may include a step 502 in which the first management node 103-A adds a correction block 218 to the blockchain public ledger 108-A. In some aspects, the correction block 218 may include a list of one or more NE resources of the connection path reserved by the block 210 to be released and/or a list of one or more NE resources of the reserved connection path that are not available. In some aspects, the one or more NE resources of the reserved connection path to be released may be one or more NE resources that were successfully activated, and the one or more NE resources of the reserved connection path that are not available may be one or more NE resources that caused the failure of the activation of the reserved connection path. In some aspects, NEs may have successfully performed activation transactions for the one or more NE resources of the reserved connection path to be released, and NEs may have failed to perform activation transactions for the one or more NE resources of the reserved connection path that are not available. In some aspects, the correction block 218 may include a correction block identification (ID), and the deactivation messages may include the correction block ID.

In some aspects, the process 500 may include a step 504 in which the first management node 103-A sends deactivation messages to each of the one or more first NEs 104-A having one or more resources of the reserved connection path and to the second management node 103-B.

In some aspects, the process 500 may include an optional step 506 in which the first management node 103-A updates the network database 109-A of the first domain 102-A to identify the one or more NE resources of the reserved connection path to be released as available and/or to identify the one or more NE resources of the reserved connection path that are not available as faulty.

In some aspects, the process 500 may include an optional step in which the first management node 103-A calculates a new connection path, the one or more released NE resources may be used in calculating the new connection path, and the one or more faulty NE resources may not be used in calculating the new connection path.

Figure 6:
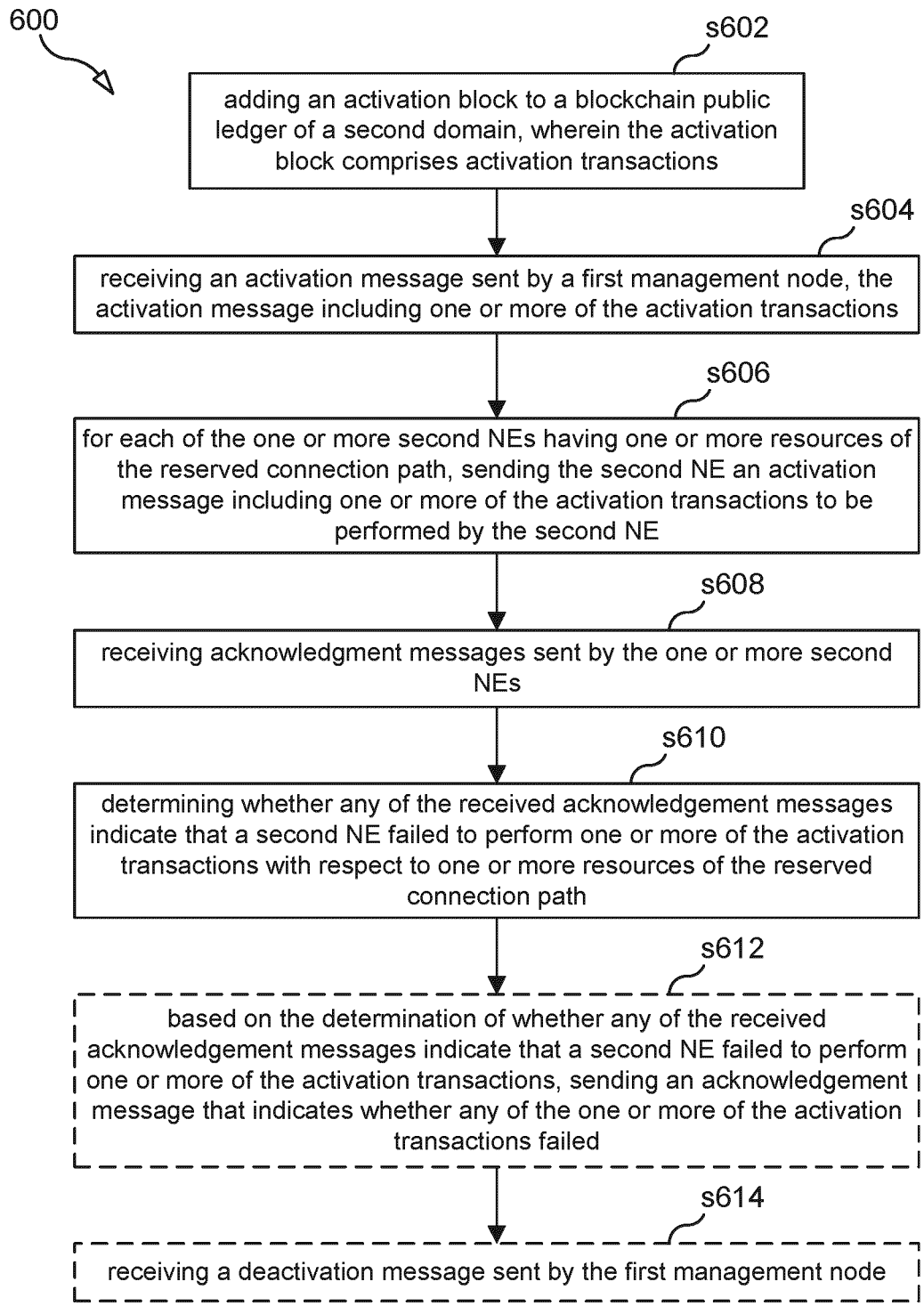
FIG. 6 is a flow chart illustrating a process performed by a management node according to some aspects.

FIG. 6 illustrates a process 600 performed by a second management node 103-B of a second domain 102-B in a telecommunication network 100 including a first domain 102-A and the second domain 102-B. The first domain 102-A may include a first management node 103-A and first network elements (NEs) 104-A, and the second domain 102-B may include the second management node 103-B and second NEs 104-B. One or more resources of one or more of the first NEs 104-A and one or more resources of one or more of the second NEs 104-B may be part of a connection path reserved by a block 210 in a blockchain public ledger 108-B. In some aspects, the one or more NE resources of the reserved connection path may include one or more ports. In some aspects, the first management node 102-A may be acting as an activation miner to initiate activation of the connection path reserved by the block 210. In some aspects, in the process 600, the second management node 103-B may be participating in the activation of the connection path reserved by the block 210 that was initiated by the first management node 103-A acting as the activation miner.

In some aspects, the process 600 may include a step 602 in which the second management node 103-B adds an activation block 212 to a blockchain public ledger 108-B of the second domain 102-B. In some aspects, the activation block 212 may include activation transactions.

In some aspects, the process 600 may include a step 604 in which the second management node 103-B receives an activation message sent by the first management node 103-A. In some aspects, the activation message may include one or more of the activation transactions. In some aspects, the one or more activation transactions of the activation message sent by the first management node 103-A may include one or more transactions related to one or more external network-to-network interface (E-NNI) ports of one or more of the second NEs 104-B.

In some aspects, the process 600 may include a step 606 in which the second management node 103-B, for each of the one or more second NEs 104-B having one or more resources of the reserved connection path, sends the second NE 104-B an activation message including one or more of the activation transactions to be performed by the second NE 104-B. In some aspects, the step 606 may include the second management node 103-B adding to one or more of the activation messages sent to the one or more second NEs 104-B having one or more resources of the reserved connection path one or more transactions related to one or more intra-domain connections 106-B of the second domain 102-B.

In some aspects, the process 600 may include a step 608 in which the second management node 103-B receives acknowledgment messages sent by the one or more second NEs 104-B having one or more resources of the reserved connection path.

In some aspects, the process 600 may include a step 610 in which the second management node 103-B determines whether any of the received acknowledgement messages indicate that a second NE 104-B failed to perform one or more of the activation transactions with respect to one or more resources of the reserved connection path.

In some aspects, the process 600 may include a step 610 in which the second management node 103-B, based on the determination of whether any of the received acknowledgement messages indicate that a second NE 104-B failed to perform one or more of the activation transactions, sends an acknowledgement message that indicates whether any of the one or more of the activation transactions failed.

In some aspects, the process 600 may include an optional step 612 in which the second management node 103-B adds a correction block 218 to the blockchain public ledger 108-B. In some aspects, the correction block 218 may include a list of one or more NE resources of the reserved connection path to be released and/or a list of one or more NE resources of the reserved connection path that are not available. In some aspects, the one or more NE resources of the reserved connection path to be released may be one or more NE resources that were successfully activated, and the one or more NE resources of the reserved connection path that are not available may be one or more NE resources that caused a failure of an activation of the reserved connection path. In some aspects, NEs 104 may have successfully performed activation transactions for the one or more NE resources of the reserved connection path to be released, and NEs 104 may have failed to perform activation transactions for the one or more NE resources of the reserved connection path that are not available.

In some aspects, the process 600 may include an optional step 614 in which the second management node 103-B receives a deactivation message sent by the first management node 103-A. In some aspects, the process 600 may include an optional step in which the second management node 103-B updates a network database 109-B of the second domain to identify the one or more NE resources of the reserved connection path to be released as available and/or to identify the one or more NE resources of the reserved connection path that are not available as faulty.

In some aspects, the process 600 may include an optional step in which the second management node 103-B calculates a new connection path, the one or more released NE resources may be used in calculating the new connection path, and the one or more faulty NE resources may not be used in calculating the new connection path.

Figure 7:
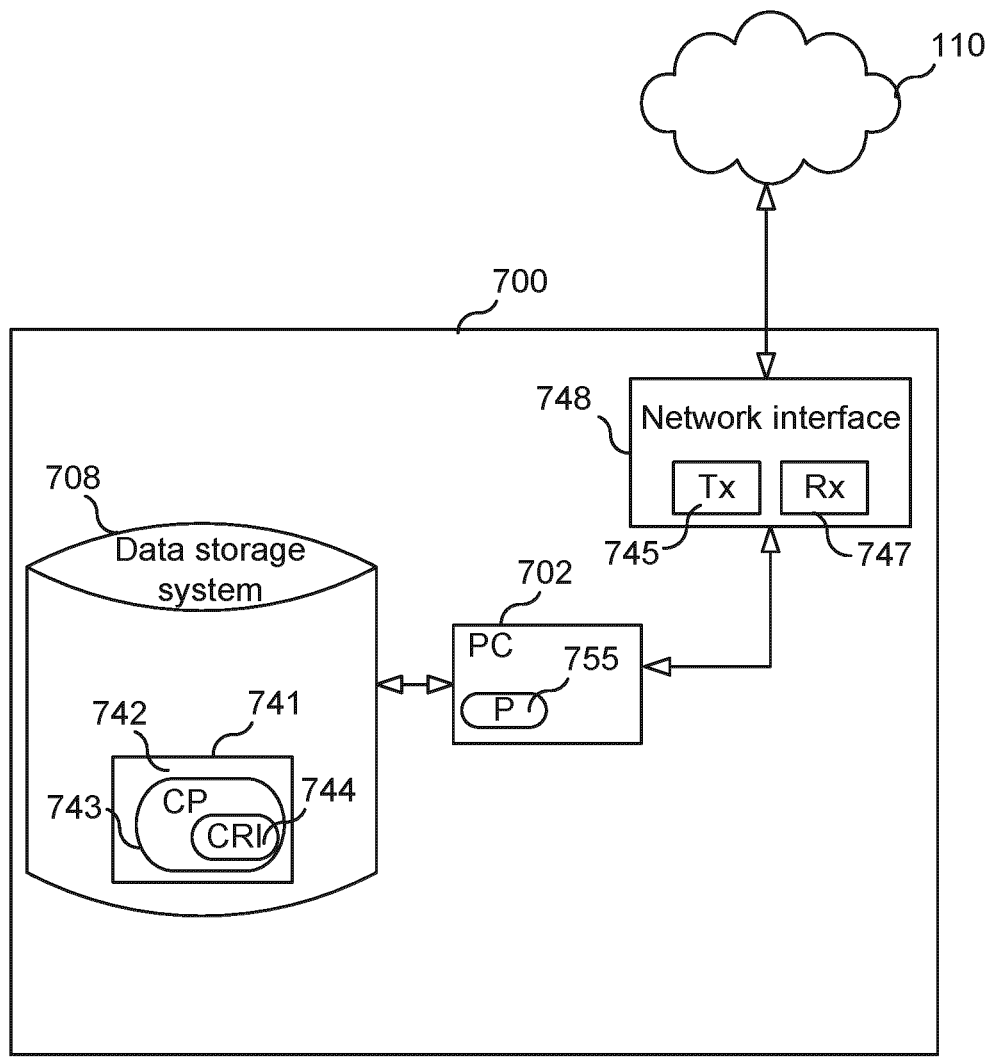
FIG. 7 is a block diagram of a management node according to some aspects.

FIG. 7 is a block diagram of an apparatus 700 (e.g., a management node 103 or a NE 104) according to some aspects. As shown in FIG. 7, the apparatus 700 may include: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 700 may be a distributed computing apparatus); at least one network interface 748 comprising a transmitter (Tx) 745 and a receiver (Rx) 747 for enabling apparatus 700 to transmit data to and receive data from other nodes connected to a network 110 (e.g., an Internet Protocol (IP) network) to which network interface 748 is connected (directly or indirectly) (e.g., network interface 748 may be wirelessly connected to the network 110, in which case network interface 748 is connected to an antenna arrangement); and a storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some aspects, the CRI 744 of computer program 743 is configured such that when executed by PC 702, the CRI causes the apparatus 700 to perform steps described herein (e.g., steps described herein with reference to the flow charts). In some other aspects, the apparatus 700 may be configured to perform steps described herein without the need for code. That is, for example, PC 702 may consist merely of one or more ASICs. Hence, the features of the aspects described herein may be implemented in hardware and/or software.

While various aspects are described herein, it should be understood that they have been presented by way of example only, and not limitation. Thus, the breadth and scope of this disclosure should not be limited by any of the above-described exemplary aspects. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. For example, two or more of steps 404, 406, and 408 of the process 400 of FIG. 4 may be performed in a different order or in parallel.

The invention claimed is:

1. A method performed by a first management node of a first domain in a telecommunication network comprising the first domain and a second domain, the first domain comprising the first management node and first network elements (NEs), the second domain comprising a second management node and second NEs, one or more resources of one or more of the first NEs and one or more resources of one or more of the second NEs being part of a connection path reserved by a block in a blockchain public ledger, the method comprising:

adding an activation block to the blockchain public ledger, wherein the activation block comprises activation transactions;

for each of the one or more of the first NEs having one or more resources of the reserved connection path, sending the first NE a first activation message including one or more of the activation transactions to be performed by the first NE;

sending the second management node a second activation message including one or more of the activation transactions;

determining that activation of the reserved connection path has failed; and if activation of the reserved connection path was determined to have failed, performing a crank-back procedure that releases one or more resources of one or more NEs of the reserved connection path, wherein performing the crank-back procedure comprises adding a correction block to the blockchain public ledger, and the correction block includes a list of one or more NE resources of the reserved connection path to be released and/or a list of one or more NE resources of the reserved connection path that are not available.

2. The method of claim 1, wherein the one or more activation transactions of the second activation message sent to the second management node includes one or more transactions related to one or more external network-to-network interface (E-NNI) ports of one or more of the second NEs.

3. The method of claim 1, further comprising sending a third activation message including one or more of the activation transactions to a third management mode of a third domain of the telecommunication network, wherein the third domain comprises the third management node and third NEs, and one or more resources of one or more of the third NEs are part of the connection path reserved by the block in the blockchain public ledger.

4. The method of claim 1, wherein determining that activation of the reserved connection path has failed comprises:

receiving an acknowledgement message from a first NE having one or more resources of the reserved connection path; and determining that the received acknowledgement message indicates that the first NE failed to perform one or more of the activation transactions.

5. The method of claim 1, wherein determining that activation of the reserved connection path has failed comprises:

receiving an acknowledgement message from the second management node; and determining that the received acknowledgement message indicates a failure of one or more of the activation transactions.

6. The method of claim 4, wherein the received acknowledgement message includes a list of any successful activation transactions and/or a list of any failed activation transactions.

7. The method of claim 1, wherein determining that activation of the reserved connection path has failed comprises determining that the first management node has not received an acknowledgement message from a first NE having one or more resources of the reserved connection path or from the second management node within a timeout period.

8. The method of claim 1, wherein the activation block includes crank-back instructions, and the crank-back procedure is performed in accordance with the crank-back instructions.

9. The method of claim 1, wherein the one or more NE resources of the reserved connection path to be released are one or more NE resources that were successfully activated, and the one or more NE resources of the reserved connection path that are not available are one or more NE resources that caused the failure of the activation of the reserved connection path.

10. The method of claim 1, wherein activation transactions were successfully performed for the one or more NE resources of the reserved connection path to be released, and activation transactions were failed to be performed for the one or more NE resources of the reserved connection path that are not available.

11. The method of claim 1, wherein performing the crank-back procedure comprises sending deactivation messages to the one or more of the first NEs having one or more resources of the reserved connection path and to the second management node.

12. The method of claim 11, wherein the correction block includes a correction block identification (ID), and the deactivation messages include the correction block ID.

13. The method of claim 1, wherein performing the crank-back procedure comprises updating a network database of the first domain to identify the one or more NE resources of the reserved connection path to be released as available and/or to identify the one or more NE resources of the reserved connection path that are not available as faulty.

14. The method of claim 13, further comprising calculating a new connection path, wherein the one or more released NE resources are used in calculating the new connection path, and the one or more faulty NE resources are not used in calculating the new connection path.

15. The method of claim 1, further comprising determining that activation of the reserved connection path has succeeded, wherein determining that activation of the reserved connection path has succeeded comprises:

receiving acknowledgement messages within a timeout period; and determining that the acknowledgement messages indicate that all of the activation transactions were successful.

16. A first management node of a first domain in a telecommunication network comprising the first domain and a second domain, the first domain comprising the first management node and first network elements (NEs), the second domain comprising a second management node and second NEs, one or more resources of one or more of the first NEs and one or more resources of one or more of the second NEs being part of a connection path reserved by a block in a blockchain public ledger, the first management node comprises:

processing circuitry; and a memory, said memory containing instructions executable by said processing circuitry, whereby said first management node is operative to perform:

adding an activation block to the blockchain public ledger, wherein the activation block comprises activation transactions;

for each of the one or more of the first NEs having one or more resources of the reserved connection path, sending the first NE a first activation message including one or more of the activation transactions to be performed by the first NE; and sending the second management node a second activation message including one or more of the activation transactions;

determining that activation of the reserved connection path has failed; and if activation of the reserved connection path was determined to have failed, performing a crank-back procedure that releases one or more resources of one or more NEs of the reserved connection path, wherein performing the crank-back procedure comprises adding a correction block to the blockchain public ledger, and the correction block includes a list of one or more NE resources of the reserved connection path to be released and/or a list of one or more NE resources of the reserved connection path that are not available.

17. The first management node of claim 16, wherein the one or more NE resources of the reserved connection path to be released are one or more NE resources that were successfully activated, and the one or more NE resources of the reserved connection path that are not available are one or more NE resources that caused the failure of the activation of the reserved connection path.

18. The first management node of claim 16, wherein performing the crank-back procedure comprises sending deactivation messages to the one or more of the first NEs having one or more resources of the reserved connection path and to the second management node.

19. The first management node of claim 16, wherein performing the crank-back procedure comprises updating a network database of the first domain to identify the one or more NE resources of the reserved connection path to be released as available and/or to identify the one or more NE resources of the reserved connection path that are not available as faulty.

20. The first management node of claim 19, wherein said first management node is further operative to perform calculating a new connection path, the one or more released NE resources are used in calculating the new connection path, and the one or more faulty NE resources are not used in calculating the new connection path.

* * * * *